US011106258B2

(12) United States Patent
Erturk et al.

(10) Patent No.: US 11,106,258 B2
(45) Date of Patent: *Aug. 31, 2021

(54) AC/DC POWER ADAPTER WITH MULTI-WINDING FEEDBACK CONVERTER

(71) Applicant: Appulse Power Inc., Toronto (CA)

(72) Inventors: Mete Erturk, San Diego, CA (US); Karim Arabi, San Diego, CA (US); Seyed-Behzad Mahdavikhah-Mehrabad, Toronto (CA); Aleksandar Radic, Toronto (CA); Sheikh Mohammad Ahsanuzzaman, Scarborough (CA)

(73) Assignee: Appulse Power Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,573

(22) Filed: Jan. 24, 2020

(65) Prior Publication Data

US 2020/0159300 A1 May 21, 2020

Related U.S. Application Data

(63) Continuation of application No. 15/583,181, filed on May 1, 2017, now Pat. No. 10,545,549.

(Continued)

(51) Int. Cl.
*G06F 1/26* (2006.01)
*H02M 3/335* (2006.01)
(Continued)

(52) U.S. Cl.
CPC .............. *G06F 1/263* (2013.01); *G05B 15/02* (2013.01); *G06F 1/26* (2013.01); *G06F 1/266* (2013.01);
(Continued)

(58) Field of Classification Search
None
See application file for complete search history.

(56) References Cited

U.S. PATENT DOCUMENTS 5,847,548 A 12/1998 He et al.
6,344,727 B1 2/2002 Desai et al.
(Continued)

FOREIGN PATENT DOCUMENTS

| CN | 101111020 A | 1/2008 |
|---|---|---|
| CN | 103607120 A | 2/2014 |
| WO | 2016101058 A1 | 6/2016 |

OTHER PUBLICATIONS

Final Office Action dated Apr. 1, 2019 for U.S. Appl. No. 15/583,181.
(Continued)

*Primary Examiner* — Paul Yen
(74) *Attorney, Agent, or Firm* — MLO, a professional corp.

(57) ABSTRACT

A power adapter for supplying electrical power to a device includes a processor, an interface for power transfer with the device, a multi-winding feedback converter to receive an AC power input and to convert the AC power input to a DC power output over the interface for the device, and a power conversion control circuit. A voltage level of the DC power output is set based on a reference voltage produced by the processor. The power conversion control circuit receives the reference voltage and a control signal based on the voltage level of the DC power output to generate switch control signals to control switches of the multi-winding feedback converter to control the voltage level of the DC power output. The processor recognizes a load associated with the device and sets, using the reference voltage, the DC power output based on the recognized load.

20 Claims, 6 Drawing Sheets

Related U.S. Application Data

(60) Provisional application No. 62/374,440, filed on Aug. 12, 2016.

(51) Int. Cl.
*G06F 1/28* (2006.01)
*G05B 15/02* (2006.01)
*H02M 1/34* (2007.01)

(52) U.S. Cl.
CPC .............. *G06F 1/28* (2013.01); *H02M 1/34* (2013.01); *H02M 3/33507* (2013.01); *H02M 3/33515* (2013.01)

(56) References Cited

U.S. PATENT DOCUMENTS

| | | |
|---|---|---|
| 6,668,296 B1 | 12/2003 | Dougherty et al. |
| 6,669,513 B2 | 12/2003 | Huang |
| 2004/0030942 A1 | 2/2004 | Barr et al. |
| 2008/0222431 A1 | 9/2008 | Paniagua et al. |
| 2008/0320322 A1 | 12/2008 | Green et al. |
| 2010/0005293 A1 | 1/2010 | Errico |
| 2011/0239008 A1 | 9/2011 | Lam et al. |
| 2012/0190412 A1 | 7/2012 | Buniatyan |
| 2013/0117850 A1 | 5/2013 | Britton et al. |
| 2014/0183974 A1 | 7/2014 | Proefrock et al. |
| 2014/0368159 A1 | 12/2014 | Han et al. |
| 2015/0357912 A1 | 12/2015 | Perreault et al. |

OTHER PUBLICATIONS

International Search Report and Written Opinion dated Nov. 16, 2017 for PCT Patent Application No. PCT/CA2017/050950.
Notice of Allowance dated Oct. 9, 2019 for U.S. Appl. No. 15/583,181.
Office Action dated Oct. 31, 2018 for U.S. Appl. No. 15/583,181.
Office Action dated Sep. 3, 2020 for Chinese Patent Application No. 201780049558.0.

＃ AC/DC POWER ADAPTER WITH MULTI-WINDING FEEDBACK CONVERTER

CROSS-REFERENCE TO RELATED APPLICATIONS

This application is a continuation of U.S. patent application Ser. No. 15/583,181, filed May 1, 2017, and claims the benefit of priority to U.S. Provisional Application No. 62/374,440 entitled "Highly Integrated Power Adapter," filed on Aug. 12, 2016, all of which are incorporated herein by reference in their entirety.

TECHNICAL FIELD

Example embodiments herein generally relate to the field of alternating current/direct current (AC/DC) power adapters, for example AC/DC power adapters for mobile devices such as laptops, cellphones, and other smart devices.

BACKGROUND

AC/DC power adapters are used in many consumer electronics products. These power adapters are often bulky, much thicker in size compared to the devices they are used to power and charge.

Current power adapters may not provide any functionality other than converting the AC power from a wall outlet to the DC power to be delivered to a mobile device. This limits their value and end-user benefit.

While power adapters are required for charging and powering mobile devices; the adapters are typically costly, take substantial space, serve a single purpose, and provide a benign experience to the consumer.

SUMMARY

In accordance with an example embodiment, there is generally provided a power adapter system with an enhanced scope of functionality and/or reduced size.

According to an example embodiment, there is provided a power adapter for supplying electrical power to a device. The power adapter includes a processor, an interface for power transfer with the device, a multi-winding feedback converter configured to receive an AC power input and configured to convert the AC power input to a DC power output over the interface for the device, a voltage level of the DC power output being set based on a reference voltage produced by the processor, and a power conversion control circuit. The power conversion control circuit is configured to receive a control signal that is based on the voltage level of the DC power output and the reference voltage produced by the processor and to generate switch control signals, the switch control signals controlling switches of the multi-winding feedback converter to control the voltage level of the DC power output. The processor is configured to recognize a load associated with the device when connected to the DC power output, and set, using the reference voltage, the DC power output based on the recognized load.

According to an example embodiment, a method performed by a power adapter involves receiving an AC power input at a multi-winding feedback converter of the power adapter, and converting, by the multi-winding feedback converter, the AC power input to a DC power output over an interface for power transfer with a device. A voltage level of the DC power output is set based on a reference voltage produced by a processor of the power adapter. A control signal that is based on the voltage level of the DC power output and the reference voltage produced by the processor are received, at a power conversion control circuit, and switch control signals are generated. The switch control signals control switches of the multi-winding feedback converter to control the voltage level of the DC power output. The processor recognizes a load associated with the device when connected to the DC power output and sets, by the processor using the reference voltage, the DC power output based on the recognized load.

According to an example embodiment, there is provided a power adapter for supplying electrical power to a mobile device. The power adapter may have a casing, a processor with an interface for data communication and power transmission with the mobile device, a memory module including memory internal to the casing of the power adapter, and an AC/DC power conversion circuit electrically coupled to the processor. The AC/DC power conversion circuit is configured to receive an AC power input and configured to convert the AC power input to a DC power output over the interface for the mobile device. The processor is configured to: recognize a load associated with the mobile device connected to the DC power output, set the DC power output based on the load, activate the memory module, receive backup data from the mobile device over the interface, and store the backup data from the mobile device within the memory.

In an example embodiment, there is provided a power adapter for supplying electrical power to a mobile device, the power adapter includes: a casing; a processor housed in the casing; an interface for data communication and power transfer with the mobile device; memory internal to the casing; an AC/DC power conversion circuit electrically coupled to the processor, the AC/DC power conversion circuit configured to receive an AC power input and configured to convert the AC power input to a DC power output over the interface for the mobile device. The processor is configured to: recognize a load associated with the mobile device when connected to the DC power output; set the DC power output based on the load; receive backup data from the mobile device over the interface; and store the backup data from the mobile device within the memory.

In another example embodiment, there is provided a method performed by a power adapter, the method includes: receiving an AC power input to an AC/DC conversion circuit electrically coupled to a processor of the power adapter; converting the AC power input to a DC power output over an interface for data communication with the mobile device; recognizing, by the processor, a load associated with the mobile device when connected to the DC power output; setting, by the processor, the DC power output based on the load; receiving, by the processor, backup data from the mobile device over the interface; and storing, by the processor, the backup data from the mobile device within memory internal to a casing of the power adapter.

In some example embodiments, the power adapter may integrate a plurality of features into a single casing or housing, and may use a single port and cable to transfer power and data simultaneously. The power adapter may be used to charge a laptop or similar mobile device, and at the same time may provide external memory/data storage backup capability. The adapter may also integrate data, audio, video and wireless connectivity, reducing the need for stand-alone conversion adapters for standards like HDMI.

In example embodiments, the aspects described herein may allow for the reduction of the number of ports required on mobile devices allowing for smaller mobile device size and extended battery life. The saved space due to the elimination of multiple ports can be used for a larger battery or additional features such as sensors or better camera.

Furthermore, the example embodiments described herein may facilitate seamless, encrypted and automatic data backup to a physically separated data storage location every time power charging occurs.

In one example embodiment, the power adapter may deliver power and data through a single port and cable using the USB-C Power Delivery standard, which can support up to 100 Watts and is sufficient for smartphones, laptops, and monitors.

In another example embodiment, the power adapter may utilize its top surface, or any of the side surfaces, for a touch pad for receiving input such as passwords, text, and similar user entries.

BRIEF DESCRIPTION OF THE FIGURES

Example embodiments will now be described, by way of example only, with reference to the attached Figures, wherein.

Like reference numerals may be used throughout the Figures to denote similar elements and features.

DETAILED DESCRIPTION OF EXAMPLE EMBODIMENTS

Figure 1A:
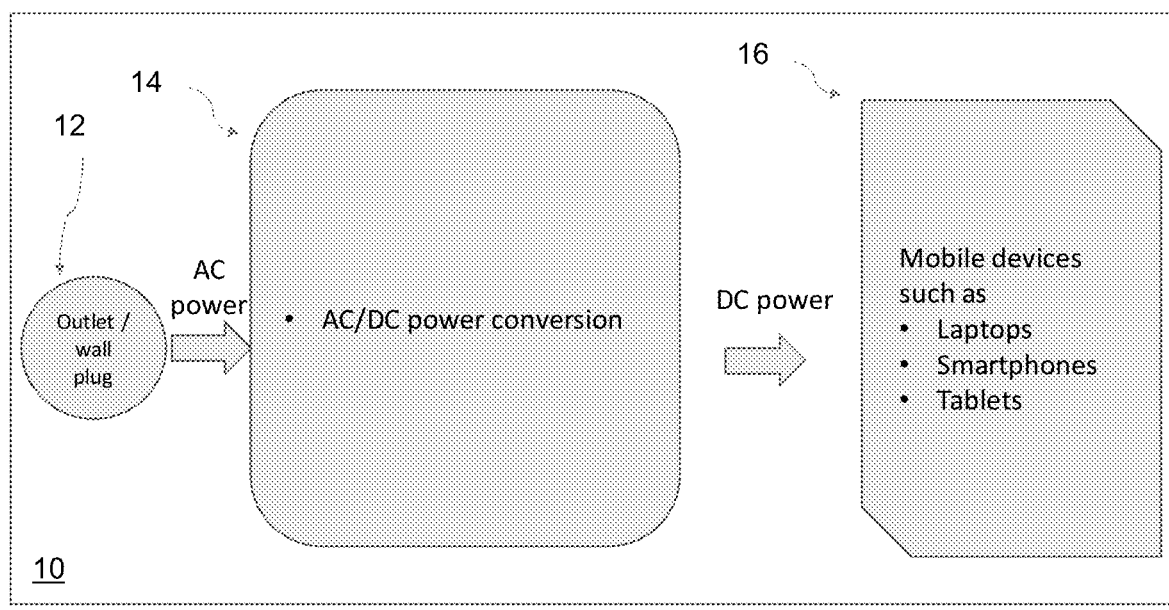
FIG. 1a is a functional diagram of a power adapter.

FIG. 1a shows an example of a power adapter 10. As depicted, the power adapter 10 receives AC power from the wall outlet 12, converts the AC power to DC using an AC/DC power conversion circuit 14, and delivers DC power to a mobile device 16.

Figure 1B:
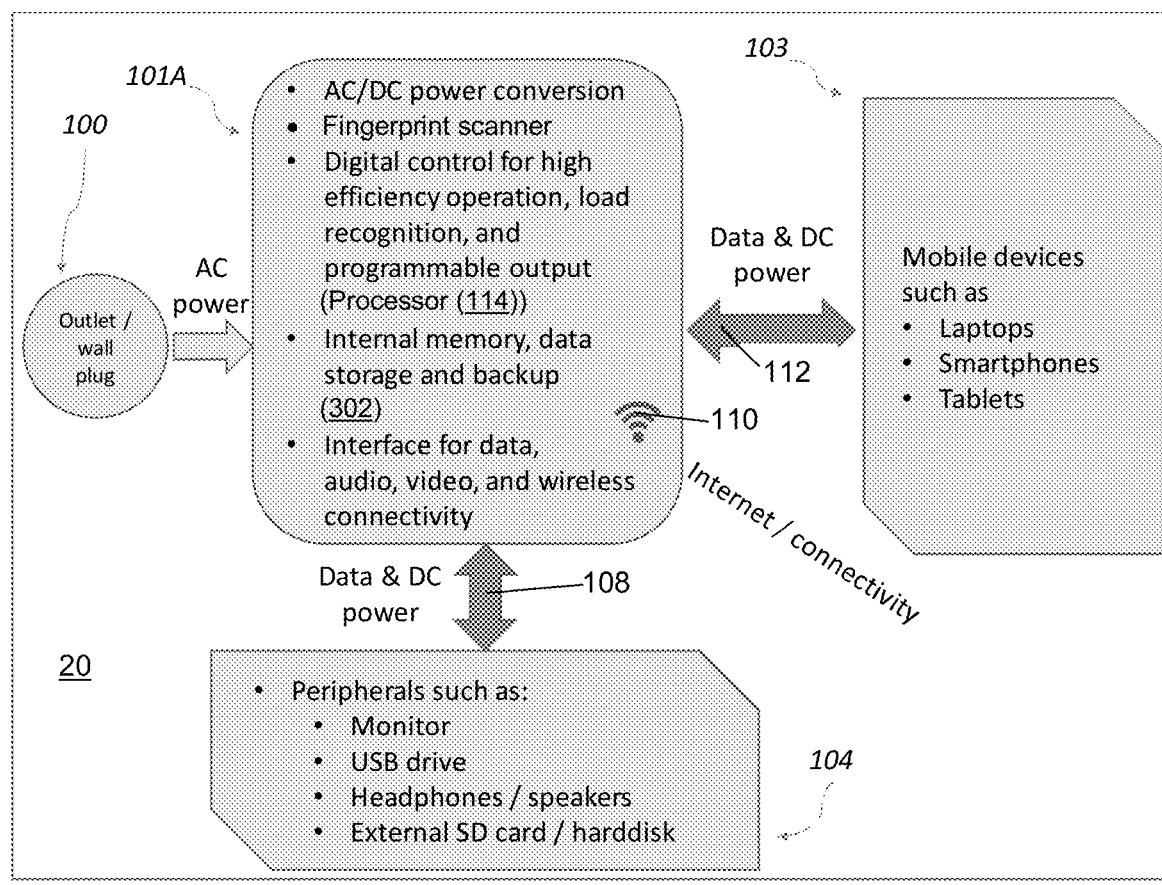
FIG. 1b is a functional diagram of a power adapter with internal memory, in accordance with an example embodiment.
Figure 2:
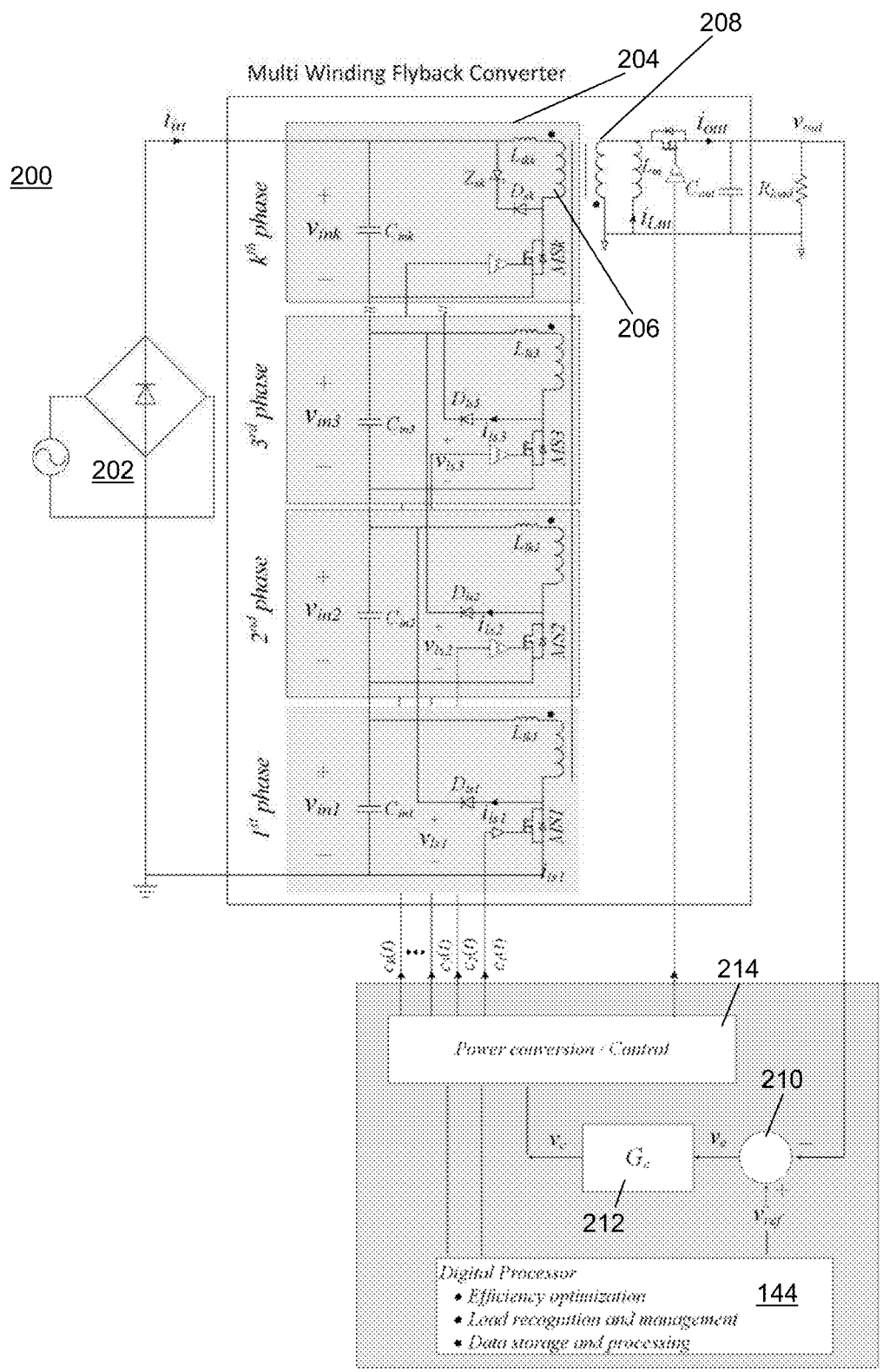
FIG. 2 depicts a schematic of an example embodiment of a multi-winding flyback converter and its associated digital processor, for the power adapter.

FIGS. 1b and 2 show an example of a highly integrated power adapter 20, in accordance with an example embodiment, comprising AC/DC power conversion circuitry 101A, a processor 144, internal memory (e.g., tangible computer-readable medium), and an interface 108 for data, audio, video, and a wireless connectivity channel 110. The power adapter 20 receives AC power from an outlet/wall plug 100 and converts the AC power to DC power using the AC/DC power conversion circuitry 101A. The DC power may be provided to mobile devices 103, such as laptops, smartphones, tablets, etc., using an interface 112. In an example embodiment, the processor 144 recognizes a load $R_{load}$ (FIG. 2) connected to the DC power and determines a programmable DC voltage output setpoint in order to provide an efficient operation to the load $R_{load}$. In an example embodiment, this is performed by using methods from USB-C, for example. The interface 112 can comprise a single interface which can be used for both 2-way data communication and 2-way DC power transmission with the mobile device 103, wherein the interface 112 can be a USB-C port, for example. The power adapter 20 may also have a plurality of external communication interfaces 108 coupled with the processor 144 for interfacing with peripheral devices 104, such as a monitor, USB drive, headphones/speakers, external SD card and/or hard drive. The power adapter 20 may also communicate with the Internet over the wireless connectivity channel 110. In some examples, the power adapter 20 may further comprise a video and/or audio interface.

Turning now to FIG. 2, there is provided a detailed schematic diagram of a multi-winding flyback converter 200 for converting AC to DC power, such as described by U.S. patent application Ser. No. 15/209,184, the contents of which are herein expressly incorporated by reference in its entirety. As shown, the multi-winding flyback converter 200 has the voltage source 202 which is configured, in this example, to provide AC to a plurality of converter cells 204 (e.g., $1^{st}$, $2^{nd}$, $3^{rd}$, . . . , $k^{th}$). Each converter cell has an input capacitor $C_{in1}$ . . . $C_{ink}$ for receiving the AC input from the voltage source 202. The individual converter cell 204 has two-winding transformers 206 adapted into a single multi-winding transformer 208. A Zener diode $Z_{sk}$ for power switch device protection and snubber energy recycling from a neighboring cell allows for universal operation across a range of input voltages of the voltage source 202. This configuration allows recycling leakage inductance $L_{lk1}$ . . . $L_{lkk}$ energy in multi-winding flyback converters 200 having a lower input voltage by only having the Zener diode $Z_{sk}$ in the last converter.

The secondary side ports of the multi-winding flyback converter 200 are, in turn, connected in parallel to an output load $R_{load}$ providing an output voltage $V_{out}$. The output voltage $V_{out}$ is sensed and compared to a reference voltage $V_{ref}$ by a subtraction block 210. The voltage difference $V_e$ is then processed by a gain compensator 212, in order to calculate a control signal Vc. The control signal is passed to a power conversion control 214 which comprises one or more controllers (e.g., hardware and/or software), which may be a multiple-output pulse-width modulator (MPWM) which generates an equivalent switch-mode power supply (SMPS) switch on-off control actions. The processor 144 may also use the control signal in order to conduct efficiency optimization, load recognition, and management.

Figure 3:
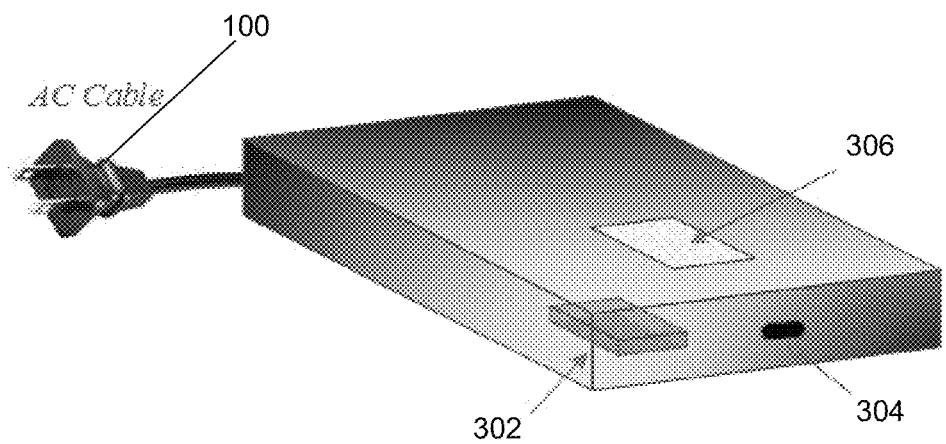
FIG. 3 is a diagram demonstrating an example embodiment of the design and construction of the power-adapter with flash memory and a fingerprint scanner.

With reference now to FIGS. 2 and 3, the processor 144 is used for power conversion/control, as well as efficiency optimization, load recognition and management, and also data storage and processing, as described in greater detail herein. The miniaturized, highly integrated, digitally controlled power adapter 20 may integrate a set of additional electronics which may include internal flash memory 302, data communication, audio ports, video ports, wireless Internet connectivity, and ports for memory expansion, wherein: AC power input is converted to DC power output; and bidirectional transfer of data and DC power takes place concurrently through a port and cable. The power adapter 20 may have one or more flash memory modules 302 located internally within the casing of the power adapter 20, allowing for encrypted or non-encrypted data storage/backup, and simultaneous transfer of data and power between the power adapter 20 and the connected mobile device 103. Upon connection of an external mobile device 103 to the power adapter 20, at least one of the memory modules 302 is activated (powered), and automatic authentication and data storage/synchronization/backup may be initiated. Activation of the memory module 302 can include converting the AC power input to DC power, and controlling activation of power to the memory module 302 using the processor 144. In some example embodiments, the plug 100 may include a cord (as shown in FIG. 3), and in other example embodiments, the plug 100 may be integrated with the casing of the power adapter 20 (e.g., prongs without a cord).

FIG. 3 shows an example embodiment where the power adapter 20 features internal flash memory module 302 internal to, and integrated within, the power adapter 20. Generally, the flash memory module 302 is within the casing of the power adapter 20 and is not readily removable. This contrasts with external removable memory cards, for example. The power adapter 20 has at least one USB-C port 304 for bidirectional data and power transfer, and for external access to the internal flash memory module 302. The flash memory module 302 can provide data storage and/or backup to the mobile device 103. The flash memory module 302 can comprise a persistent memory. A fingerprint scanner 306 may provide fingerprint data for authentication of a user associated with the power adapter 20, as is further discussed with reference to FIG. 6 below. In some example embodiments, the power adapter 20 may deliver power through the USB-C port 304 using the USB-C Power Delivery standard, which can support up to 100 Watts and is sufficient for smartphones, laptops, and monitors. Multiple USB-C ports 304 may be integrated within the adapter 20, allowing for the charging and/or backup of multiple mobile devices 103, and also direct data transfer between mobile devices 103 without requiring a general-purpose computer (not shown).

In an example embodiment, integration of the flash memory module 302 internal to the power adapter 20 is performed by having the memory module 302 contained within a casing/housing of the power adapter 20. In an example embodiment, the casing is two or more casing parts that are snapped, screwed, or sealed together, for example. In another example embodiment, the casing is unitary. In an example embodiment, the flash memory module 302 and associated memory module is substantially permanently integrated within the power adapter 20, and/or not readily removable. For example, in some example embodiments, the memory module 302 is embedded in hardware, such as located on the same hardware platform (e.g., silicon die, chip, printed circuit board) as other components of the power adapter 20, such as co-located with the processor 114 and/or the AC/DC power conversion circuitry 101A.

Referring still to FIG. 2, the processor 114 is configured to perform recognizing of the load $R_{load}$ (FIG. 2) associated with the mobile device 103, upon connection to the interface 112 in order to provide DC power output to the mobile device 103. In an example embodiment, upon connection of the mobile device 103 to the interface 112 (e.g., the USB-C port 304), a control signal or control communication is performed between the mobile device 103 and the processor 114. The mobile device 103 sends one or more communication messages that advise of the specified required voltage of the mobile device 103 and also advises of the maximum specified permissible current. For example, this conveying of the power requirements can accord with a protocol such as the USB-C protocol.

During DC power output, the AC/DC power conversion circuitry 101A provides the mobile device 103 with appropriate output $V_{out}$, which achieves the real-time current load requirements of the mobile device 103. This is achieved using the voltage comparison between the output voltage $V_{out}$ and the reference voltage $V_{ref}$ in order to output the desired voltage $V_{ref}$ as described above.

In an example embodiment, the mobile device 103 may be loaded with a specific application or operating system feature that permits the automatic backup of data of the mobile device 103 to the memory module 302 of the power adapter 20. In some example embodiments, the mobile device 103 may provide a prompt to the user the first time the mobile device 103 is connected, regarding whether the user wishes to always backup the data upon operable connection to the power adapter 20. In some example embodiments, the user can manually backup when connected.

Figure 4:
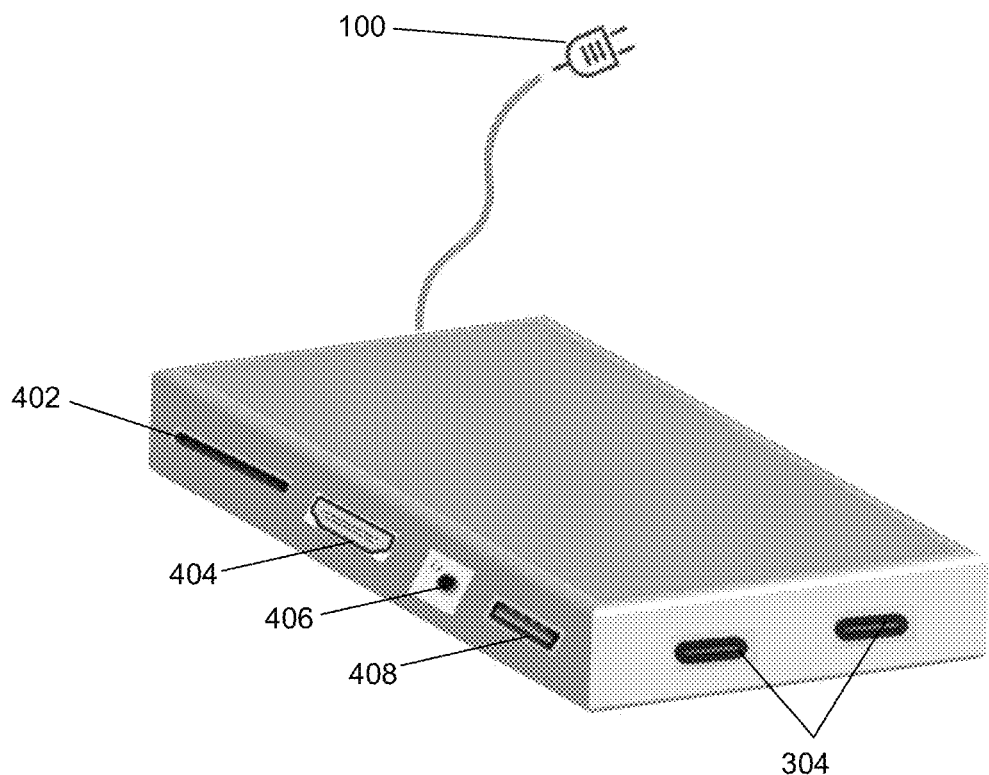
FIG. 4 is another diagram demonstrating another example embodiment of the design and construction of the power adapter.

FIG. 4 shows another embodiment where the integrated power adapter 20 includes peripheral modules or peripheral interfaces such as one SD card insertion slot 402, HDMI connector 404, audio connector 406, USB-A port 408, and two USB-C ports 304 for bidirectional data and power transfer. A 3.5 mm audio connector 406 may be integrated within the adapter 20, allowing for the use of headphones with the power adapter 20. The digital to analog conversion (DAC) for the audio signal is executed using the processor 144 within the adapter 20. An HDMI connector 404 is integrated within the adapter 20, allowing for connection to a monitor or TV for graphics display (not shown). The HDMI to USB-C conversion is done within the adapter 20 by the processor 144. For example, the HDMI connector 404 can be used for display output from the mobile device 103 when both are connected to the power adapter 20, or for outputting audio to the audio connector 406, etc. A USB type-A port 408 integrated within the adapter allows for connection to USB-A peripherals such as memory sticks, and/or DVD/CD writers. In some example embodiments, additional peripheral interfaces include VGA and Ethernet. The power adapter 20 can be configured to act as a hub or a through connector that communicatively connects different devices by way of the various interfaces. Any or all of the example peripheral interfaces can be accessed by the mobile device 103 when the mobile device 103 is plugged into the USB-C port 304 and the applicable peripheral is also plugged into the power adapter 20. In some example embodiments, as applicable, the power adapter 20 also provides the applicable DC power to a peripheral when plugged into the peripheral interface. For example, the AC to DC circuitry described herein.

When the power adapter 20 is not plugged into the AC source, for example, the bidirectional power-up circuit 602 from the source or sink can be configured to enable DC to DC power to the plugged-in peripheral device by receiving DC power from the mobile device 103, or vice versa.

Figure 5:
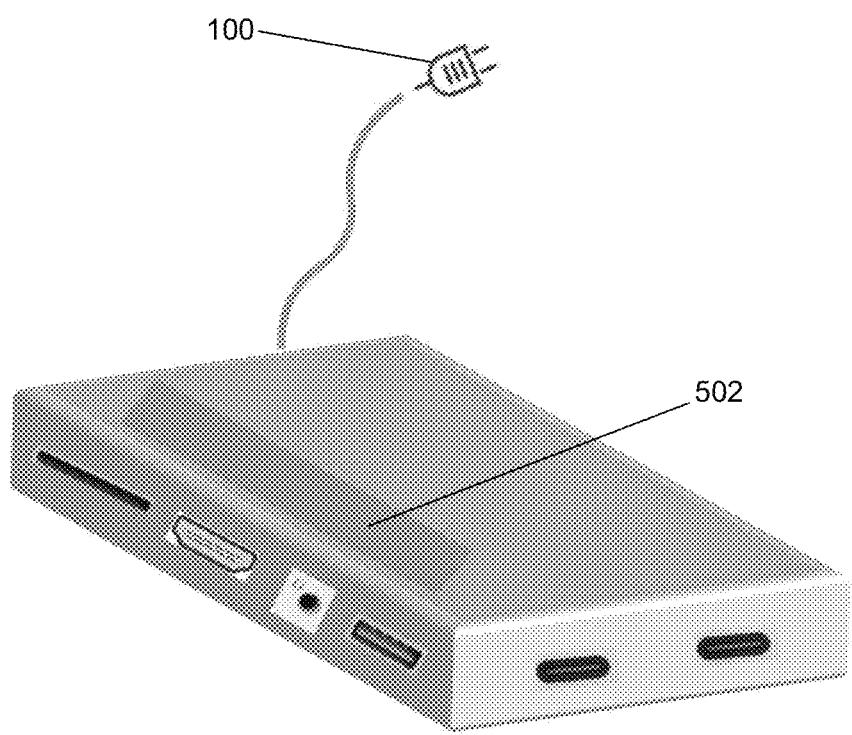
FIG. 5 is another diagram showing another example embodiment of the power adapter with a touchpad added to a top surface for user input.

FIG. 5 shows yet another embodiment where the integrated power adapter 20 has a touchpad 502 on its top surface for user input entry. The touchpad 502 may be any type of touchpad 502 such as, for example, a capacitive touch screen, a projected capacitive touch screen, an analog-resistive touch screen, or an optical touch screen. The touchpad 502 may comprise a display associated therewith to display a user interface that accepts input from the touchpad 502. In other embodiments, the touchpad 502 may have permanent graphics or icons corresponding to functions of the integrated power adapter. The touchpad 502 may be used for receiving input such as passwords, text, and similar user entries. In another example embodiment, the power adapter may utilize any of the side surfaces for the touchpad 502. In an example embodiment, the touchpad 502 may be activated (e.g., enabled to accept fingerprint input or touch commands) upon connection of the mobile device 103 to the power adapter 20.

Figure 6:
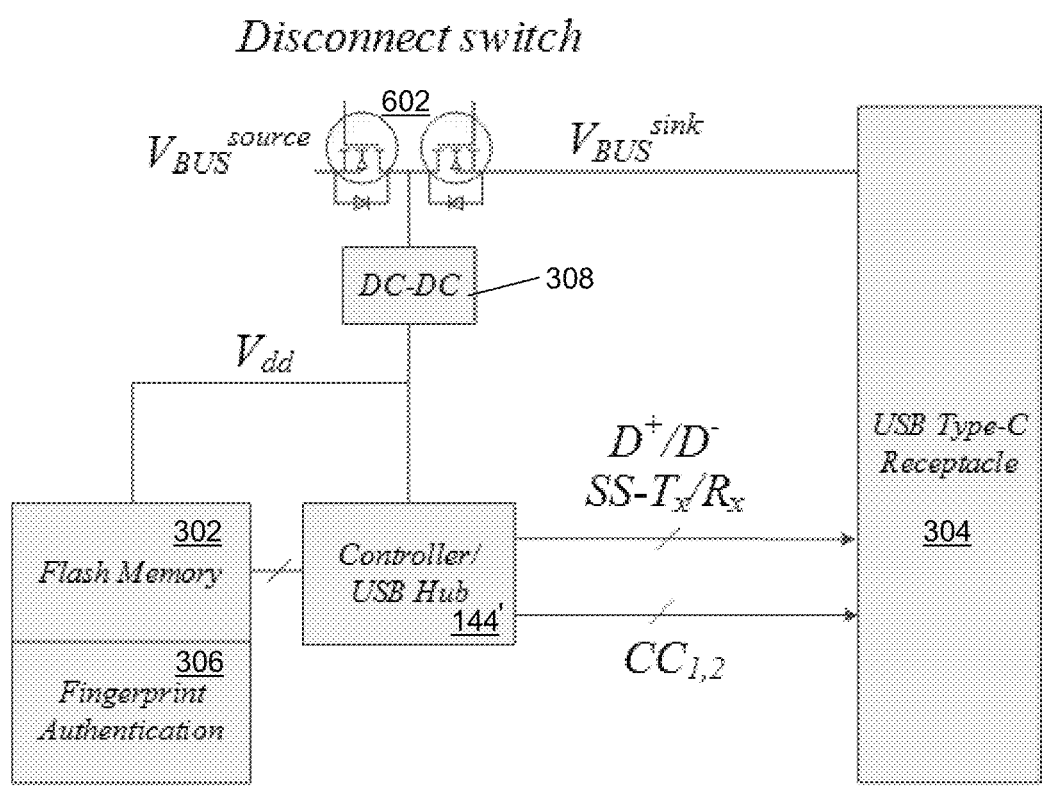
FIG. 6 is another diagram showing another example embodiment of the power adapter with flash memory and associated circuits enabling access to the stored memory when power is provided by the source and/or sink.

FIG. 6 shows a more detailed block-level diagram of the highly integrated power adapter 20 having internal flash memory module 302, in an example embodiment. The flash memory module 302 and fingerprint scanner 306 with the processor 144 (e.g., of a controller/USB hub controller 144'). The processor 144, in turn, receives and transmits data via SuperSpeed differential pairs SS-$T_x/R_x$ to the mobile device 103 through the USB Type-C port 304. The processor 144 also provides one or more control channels $CC_{1,2}$ to the receptacle. A sink/source power management bidirectional power-up circuit 602 uses a USB Type-C disconnect switch that provides power to the processor 144, flash memory 302, and fingerprint scanner 306 by way of a DC-DC converter 308 from the DC output of the AC/DC converter. When the power adapter 20 is not plugged into the AC source, for example, the bidirectional power-up circuit 602 from the source or sink enables access to the backup data stored in the flash memory module 302 by receiving DC power from the mobile device 103.

In some example embodiments, the internal flash memory module 302 may be partitioned by the processor 144 into one or more partitions. Each partition may be specific to a particular mobile device 103 that is configured for use with the adapter 20. The processor 144 may assign and identify which particular mobile device 103 is connected using a unique identifier, and the partition may be associated with the unique identifier. Other unique identifiers may be used, such as serial number, MAC address, Personal Identification Number, token, or signature.

For example, a user may have a mobile phone and a laptop. The flash memory module 302 has two partitions, one for each device 103. In an example embodiment, the partition is performed using specified criteria, such as 50% partition of available memory for each of 2 devices, or 33% for 3 devices, etc. Higher or lower memory allocations may be specified, for example, either automatically by the processor 144 or manually via user or administrative input. The mobile phone partition may be formatted in accordance with the file system that is readable and writable by the mobile phone. The laptop partition may likewise be formatted in accordance with the file system that is readable and writable by the laptop. In some examples, the data stored in partitions may be hidden from other mobile devices 103. When the respective mobile device 103 connects with the adapter 20, the processor 144 interfaces with software executing on the mobile device 103 and receives the unique identifier and may be configured to automatically backup any data that has changed since the last connection to the partition associated with the unique identifier. Since the adapter 20 is needed to charge the mobile device 103, this provides a convenient backup without interfering with the user's operation of the mobile device 103. In some example embodiments, the USB-C port 304 may be used to retrieve the backup data from the flash memory module 302.

In some embodiments, the data stored in the flash memory module 302 may be automatically encrypted by the processor 144. Each partition may be encrypted or encoded (e.g., signed) with a specific encryption key, which can be generated by either the mobile device 103 or by the processor 144, in example embodiments. The key may be part of a key pair, in an example embodiment. The key and/or a symmetric decryption key may be known to the mobile device 103 that is accessing data or saving data to that partition. In some other example embodiments, the accessing mobile device 103 presents a token or unique signature in order to be authenticated by the processor 144. In some other example embodiments, in order to permit access to the encrypted backup data, the fingerprint scanner 306 provides fingerprint data from a user to the processor 144 which is compared to a database of authorized users. If a match/authentication occurs, the processor 144 permits access to the encrypted data by decrypting it prior to transfer to the connected mobile device 103. In some example embodiments, the processor 144 sends the data as encrypted data to the connected mobile device 103.

Although the embodiments described herein have a partition specific to each particular mobile device 103, other embodiments may have a compressed file for each mobile device 103.

In some example embodiments, other biometric detectors may be used, for example iris, voice, or facial recognition scanners, and the like, as understood in the art. In an example embodiment, the biometric detector(s) may be activated (e.g., enabled to accept biometric data from the user) upon connection of the mobile device 103 to the power adapter 20.

According to some aspects of the embodiments, Internet connectivity may be integrated within the adapter, allowing for wireless communication with the Internet and/or a plurality of local devices such as the Internet of Things.

According to some embodiments, the communication paths between the various connectors may be dynamically re-configured by the processor 144 of the power adaptor 20. For example, the 3.5 mm audio connector 406 may be configured to communicate with any of the compatible USB Type-C connected devices. The reconfiguration of communication channels may be initiated by the user using the touchpad 502 integrated on a surface of the power adapter 20.

In example embodiments, as applicable, the processor 144 or controllers can be implemented by or executed by, for example, one or more of the following systems: Programmable Logic Controller (PLC), Application-specific integrated circuit (ASIC), Field-programmable gate array (FPGA), hardware, and/or software. The controller can include a processor which is configured to execute instructions stored in a computer-readable medium such as memory.

In some example embodiments, such as disclosed by U.S. patent application Ser. No. 15/209,184, incorporated herein by reference, the top multi-winding flyback converter cells may be adapted to utilize the combined snubber and voltage regulator circuits. The snubber and voltage regulator circuits may be placed in parallel with the transformer's primary side leakage inductance current paths. In addition, the voltage regulator output voltage ports may be connected to the gate driver voltage rails. The voltage regulator may recycle the transformer leakage energy via the voltage snubber. For large input voltage applications the voltage regulator peak input voltage may be reduced significantly, enabling for the miniaturization, cost optimization, and power loss reduction of the voltage regulator. The voltage regulator and gate driver circuit reduce the voltage snubber power losses during low-to-medium output power loads. The power loss reduction is due to the variable effective resistance of the voltage regulator and gate driver combinations which draws less power from the voltage snubber capacitor at lower power levels. These alternative embodiments may allow for further reduction of the snubber losses during low output power load levels when a variable voltage regulator is utilized. By allowing the output voltage of the voltage regulator to track the snubber capacitor (which is smaller during low-load operation), the effective power consumption of the gate drivers can be reduced further. In such a way, the dominant gate driver power losses may be significantly reduced during SMPS low-to-medium output power load operating conditions contributing to higher overall SMPS power processing efficiency.

Figure 7:
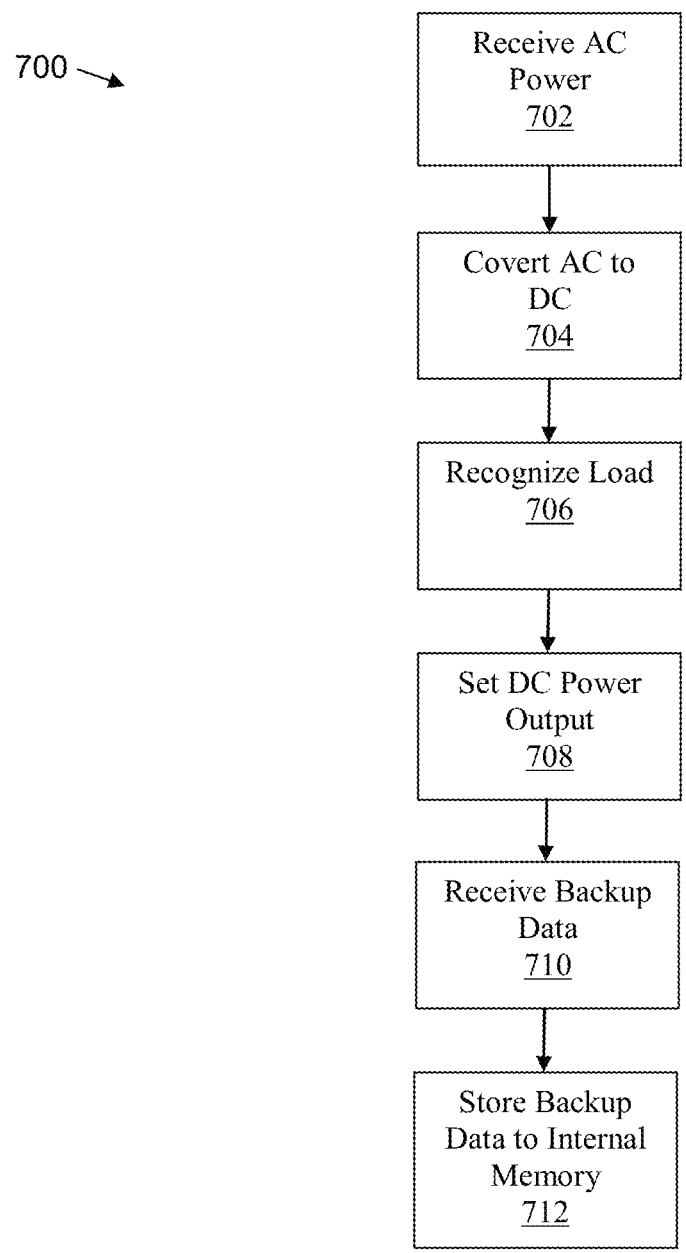
FIG. 7 is a flow diagram of a method performed by a power adapter for supplying electrical power to a mobile device.

Reference is now made to FIG. 7, which illustrates a flow diagram of a method 700 performed by the power adapter 20 for supplying electrical power to the mobile device 103, in accordance with an example embodiment. At event 702, the method 700 includes receiving an AC power input to the AC/DC power conversion circuitry 101A of the power adapter 20. At event 704, the method 700 includes converting the AC power input to a DC power output over the interface 112 for data communication with the mobile device 103. At event 706, the method 700 includes recognizing, by the processor 114, the load associated with the mobile device 103 when connected to the DC power output. The recognizing can include control communications between the mobile device 103 and the processor 114. At event 708, the method 700 includes setting, by the processor 114, the DC power output based on the detected load. At event 710, the method 700 includes receiving, by the processor 114, backup data from the mobile device 103 over the interface 112. At event 712, the method 700 includes storing, by the processor 114, the backup data from the mobile device 103 within memory 302 that is internal to the casing of the power adapter 20.

In example embodiments, as appropriate, each illustrated block or module may represent software, hardware, or a combination of hardware and software. Further, some of the blocks or modules may be combined in other example embodiments, and more or fewer blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer-readable medium including program instructions recorded thereon, or a computer data signal carrying computer-readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the steps or processes may be performed in a different order provided that the result of the changed order of any given step will not prevent or impair the occurrence of subsequent steps. Furthermore, some of the steps described above may be removed or combined in other embodiments, and some of the steps described above may be separated into a number of sub-steps in other embodiments. Even further, some or all of the steps of the conversations may be repeated, as necessary.

Elements described as methods or steps similarly apply to systems or subcomponents, and vice-versa.

The term "computer-readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid-state disk," other electronic storage of any type including a charge-coupled device (CCD), or magnetic bubble memory.

Variations may be made to some example embodiments, which may include combinations and sub-combinations of any of the above. The various embodiments presented above are merely examples and are in no way meant to limit the scope of this disclosure. Variations of the example embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above-discussed embodiments are considered to be illustrative and not restrictive.

What is claimed is:

1. A power adapter for supplying electrical power to a device, the power adapter comprising:
   a processor;
   an interface for power transfer with the device;
   a multi-winding feedback converter configured to receive an AC power input and configured to convert the AC power input to a DC power output over the interface for the device, a voltage level of the DC power output being set based on a reference voltage produced by the processor; and
   a power conversion control circuit configured to receive a control signal that is based on the voltage level of the DC power output and the reference voltage produced by the processor and to generate a plurality of switch control signals, the plurality of switch control signals controlling a plurality of switches of the multi-winding feedback converter to control the voltage level of the DC power output;
   wherein the processor is configured to:
     recognize a load associated with the device when connected to the DC power output; and
     set, using the reference voltage, the DC power output based on the recognized load.

2. The power adapter according to claim 1, wherein:
the multi-winding feedback converter comprises a plurality of converter cells, each converter cell of the plurality of converter cells comprising an input capacitor and a winding of a multi-winding transformer.

3. The power adapter according to claim 2, wherein:
a converter cell of the plurality of converter cells further comprises a snubber circuit and a voltage regulator circuit, the snubber circuit and the voltage regulator circuit being placed in parallel with a primary side leakage inductance current path of the multi-winding transformer.

4. The power adapter according to claim 3, wherein:
a voltage regulator output voltage port of the voltage regulator circuit is connected to a voltage rail of a gate driver circuit of the power adapter, the gate driver circuit being configured to control a switch of the plurality of switches of the multi-winding feedback converter.

5. The power adapter according to claim 2, wherein:
a first converter cell of the plurality of converter cells further comprises a Zener diode for recycling energy from a snubber circuit.

6. The power adapter according to claim 2, wherein:
a first converter cell of the plurality of converter cells comprises a snubber circuit; and
a second converter cell of the plurality of converter cells comprises a voltage regulator circuit for recycling energy from the snubber circuit.

7. The power adapter according to claim 1, wherein:
the power adapter comprises multiple connectors; and
the processor is configured to dynamically configure communication paths between the multiple connectors.

8. The power adapter according to claim 7, wherein:
the multiple connectors comprise an audio connector configured to receive an audio output from the device.

9. The power adapter according to claim 7, wherein:
the multiple connectors comprise an HDMI connector configured to receive a display output from the device.

10. The power adapter according to claim 1, wherein:
the power adapter comprises multiple USB-C ports.

11. The power adapter according to claim 1, wherein:
the power adapter comprises a peripheral interface; and
the power adapter is configured to provide an applicable DC power to a peripheral when the peripheral is plugged into the peripheral interface.

12. The power adapter according to claim 11, wherein:
the power adapter is configured to provide the applicable DC power to the peripheral when the peripheral is plugged into the peripheral interface by receiving DC power from the device.

13. The power adapter according to claim 1, further comprising:
a peripheral interface for connection to a peripheral, wherein the processor is configured to enable a data communication between the peripheral and the device through the power adapter when the peripheral and the device are both connected.

14. The power adapter according to claim 1, wherein:
the processor is configured to use the control signal to conduct efficiency optimization for the multi-winding feedback converter.

15. The power adapter according to claim 1, wherein:
the interface further comprises a bidirectional electrical input for receiving DC power from the device, the bidirectional electrical input providing electrical power to the processor using the DC power received from the device.

16. The power adapter according to claim 1, wherein:
the interface is further configured for data communication with the device; and
the processor is further configured to concurrently transfer data and power over the interface.

17. The power adapter according to claim 1, wherein:
the interface is further configured for data communication with the device; and
the processor is configured to recognize the load by at least receiving a data communication from the device over the interface.

18. The power adapter according to claim 1, wherein:
the interface is further configured for data communication with the device;
the processor is configured to receive one or more data communications from the device that advise of a maximum specified permissible current of the device.

19. A method performed by a power adapter, the method comprising:
receiving an AC power input at a multi-winding feedback converter of the power adapter;
converting, by the multi-winding feedback converter, the AC power input to a DC power output over an interface for power transfer with a device, a voltage level of the DC power output being set based on a reference voltage produced by a processor of the power adapter;
receiving, at a power conversion control circuit, a control signal that is based on the voltage level of the DC power output and the reference voltage produced by the processor and generating a plurality of switch control signals, the plurality of switch control signals controlling a plurality of switches of the multi-winding feedback converter to control the voltage level of the DC power output;
recognizing, by the processor, a load associated with the device when connected to the DC power output; and
setting, by the processor using the reference voltage, the DC power output based on the load.

20. The method according to claim 19, wherein:
the interface is further configured for data communication with the device; and
the processor is configured to recognize the load by at least receiving a data communication from the device over the interface.

* * * * *